(12) United States Patent
Crosby et al.

(10) Patent No.: US 9,791,029 B2
(45) Date of Patent: Oct. 17, 2017

(54) RESIDENTIAL TRANSMISSION

(71) Applicant: Parker-Hannifin Corporation, Cleveland, OH (US)

(72) Inventors: Michael Tholan Crosby, Jonesborough, TN (US); Jason Lee Emmette, Greeneville, TN (US); David Mark Heathcoat, Jr., Greeneville, TN (US); Jason Scot Richardson, Chuckey, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 283 days.

(21) Appl. No.: 14/245,527

(22) Filed: Apr. 4, 2014

(65) Prior Publication Data

US 2014/0305091 A1    Oct. 16, 2014

Related U.S. Application Data

(60) Provisional application No. 61/808,267, filed on Apr. 4, 2013.

(51) Int. Cl.
*F16H 39/06* (2006.01)
*A01D 69/03* (2006.01)
(Continued)

(52) U.S. Cl.
CPC ............. *F16H 39/06* (2013.01); *A01D 69/03* (2013.01); *B60K 17/105* (2013.01); *F16H 7/02* (2013.01); *F16H 47/02* (2013.01)

(58) Field of Classification Search
CPC .......... A01D 69/03; A01D 69/06; F16H 7/02; F16H 31/006; F16H 37/02; F16H 39/06;
(Continued)

(56) References Cited

U.S. PATENT DOCUMENTS 4,359,116 A    11/1982 Mankey
4,738,328 A    4/1988 Hayden
(Continued)

FOREIGN PATENT DOCUMENTS

WO    00/19127    4/2000

OTHER PUBLICATIONS

Hydro-Gear, BDU-10/21 Hydrostatic Transmission Service and Repair Manual, Jan. 2009, pp. 3 and 4.*
(Continued)

*Primary Examiner* — Logan Kraft
(74) *Attorney, Agent, or Firm* — Renner, Otto, Boisselle & Sklar, LLP

(57) ABSTRACT

Provided is a hydrostatic transmission including a pump/motor module having a reservoir housing and a hydraulic pump and motor disposed in the reservoir housing, and a speed reduction module having a speed reduction housing coupled to the reservoir housing and a speed reduction assembly disposed in the speed reduction housing. The speed reduction assembly includes an input member driven by the output shaft of the hydraulic motor, an output member rotationally connected to the input member by one or more belts/chains, and an axle shaft driven by rotation of the output member. By providing the speed reduction assembly in a separate housing from the hydraulic fluid in the reservoir housing, the speed reduction assembly is isolated from the hydraulic fluid thereby preventing particulates from the speed reduction assembly from entering the hydraulic fluid in the reservoir housing.

18 Claims, 13 Drawing Sheets

(51) Int. Cl.
B60K 17/10 (2006.01)
F16H 7/02 (2006.01)
F16H 47/02 (2006.01)

(58) Field of Classification Search
CPC ...... F16H 47/065; F16H 55/32; F16H 61/664;
B60K 17/105
USPC .......................................................... 60/487
See application file for complete search history.

(56) References Cited

U.S. PATENT DOCUMENTS

| | | | |
|---|---|---|---|
| 5,078,222 A | 1/1992 | Hauser | |
| 5,768,955 A * | 6/1998 | Hauser | B60K 17/105 |
| | | | 180/305 |
| 6,185,920 B1 | 2/2001 | Oxley | |
| 6,343,471 B1 * | 2/2002 | Thoma | B60K 17/105 |
| | | | 60/487 |
| 6,672,058 B1 * | 1/2004 | Langenfeld | B60K 17/105 |
| | | | 180/6.3 |
| 6,775,976 B1 * | 8/2004 | Phanco | B60K 17/105 |
| | | | 60/484 |
| 6,892,595 B2 * | 5/2005 | Inoue | B60T 1/062 |
| | | | 74/336 B |
| 7,237,629 B1 | 7/2007 | Bland et al. | |
| 7,370,714 B2 * | 5/2008 | Yasuda | A01D 34/6806 |
| | | | 180/305 |
| 8,453,499 B2 * | 6/2013 | Johannsen | G01P 1/026 |
| | | | 73/115.08 |
| 8,613,342 B2 * | 12/2013 | Jackson | A01D 34/82 |
| | | | 180/305 |
| 2011/0083413 A1 | 4/2011 | Jackson et al. | |

OTHER PUBLICATIONS

ZT-2100/AT-2200 (EZT®) Integrated Zero-Turn Transaxle Service and Repair Maunal, BLN-52622, May 2013.

* cited by examiner

RESIDENTIAL TRANSMISSION

RELATED APPLICATIONS

This application claims the benefit of U.S. Provisional Application No. 61/808,267 filed Apr. 4, 2014, which is hereby incorporated herein by reference.

FIELD OF INVENTION

The present invention relates generally to transmissions, and more particularly to transmissions for use in vehicles, such as mowing machines.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or the prime mover also decreases.

SUMMARY OF INVENTION

The present invention provides a hydrostatic transmission including a pump/motor module having a reservoir housing and a hydraulic pump and motor disposed in the reservoir housing, and a speed reduction module having a speed reduction housing coupled to the reservoir housing and a speed reduction assembly disposed in the speed reduction housing. The speed reduction assembly includes an input member driven by the output shaft of the hydraulic motor, an output member rotationally connected to the input member by one or more belts/chains, and an axle shaft driven by rotation of the output member. By providing the speed reduction assembly in a separate housing from the hydraulic fluid in the reservoir housing, the speed reduction assembly is isolated from the hydraulic fluid thereby preventing particulates from the speed reduction assembly from entering the hydraulic fluid in the reservoir housing.

According to one aspect of the invention, a hydrostatic transmission is provided that includes a pump/motor module including a reservoir housing forming interiorly thereof a reservoir chamber for containing hydraulic fluid a hydraulic pump disposed in the reservoir housing, and a hydraulic motor disposed in the reservoir housing and fluidly coupled to the hydraulic pump, the hydraulic motor including an output shaft extending through an opening in the reservoir housing, and a speed reduction module including a speed reduction housing configured to be coupled to the reservoir housing, and a speed reduction assembly disposed in the speed reduction housing, the speed reduction assembly including an input member driven by the output shaft of the hydraulic motor, an output member rotationally connected to the input member by one or more belts/chains, and an axle shaft extending through an opening in the speed reduction housing and being driven by rotation of the output member.

The pump/motor module may include a shaft seal surrounding the output shaft of the hydraulic motor for preventing fluid in the reservoir chamber from flowing into the speed reduction housing.

The pump/motor module and the speed reduction module may form a u-shaped configuration when coupled together.

The input member may surround the output shaft of the motor, and wherein rotation of the output shaft effects rotation of the input member.

The input member may include a first pulley/sprocket and the output member includes a second pulley/sprocket.

The speed reduction assembly may further include an intermediate shaft and third and fourth pulley/sprockets surrounding the intermediate shaft.

The speed reduction assembly may further include a first belt/chain connecting the first pulley/sprocket and the third pulley/sprocket, and a second belt/chain connecting the fourth pulley/sprocket and the second pulley/sprocket, thereby providing a two stage reduction assembly.

The speed reduction assembly may further include a brake assembly connected to the third and fourth pulley/sprockets for braking the axle shaft.

According to another aspect of the invention, a hydrostatic transmission is provided that includes a hydraulic pump, a hydraulic motor fluidly connected to the hydraulic pump and including an output shaft, and a speed reduction assembly driven by the hydraulic motor, the speed reduction assembly including an input, an output connected to the input by first and second speed reducers in series, and a brake acting on the first speed reducer.

The first speed reducer may include a first pulley/sprocket connected to the input and a second pulley/sprocket, and wherein the brake acts on the second pulley/sprocket.

The second speed reducer may include a third pulley/sprocket connected to the second pulley/sprocket for rotation therewith and a fourth pulley sprocket connected to the output.

According to still another aspect of the invention, a hydrostatic transmission is provided that includes a pump/motor module including a reservoir housing forming interiorly thereof a reservoir chamber for containing hydraulic fluid, a hydraulic pump disposed in the reservoir housing, and a hydraulic motor disposed in the reservoir housing and fluidly coupled to the hydraulic pump, the hydraulic motor including an output shaft extending through an opening in the reservoir housing, and a speed reduction module including a speed reduction housing configured to be coupled to the reservoir housing, and a speed reduction assembly disposed in the housing, the speed reduction assembly including an input member driven by the output shaft of the hydraulic motor, a first intermediate member rotationally connected to the input member by a first belt/chain, a second intermediate member connected to the first intermediate member for rotation therewith, an output member rotationally connected to the second intermediate member by a second belt/chain, and an axle shaft extending through an opening in the speed reduction housing and being driven by rotation of the output member.

The foregoing and other features of the invention are hereinafter described in greater detail with reference to the accompanying drawings.

DETAILED DESCRIPTION

The principles of the present application have particular application to mowers, such as zero-turn-radius mowers, and thus will be described below chiefly in this context. It will of course be appreciated and also understood that the principles of the invention may be useful in other vehicles, such as vehicles utilizing mechanical, hydrostatic, hydraulic, or electric drive systems.

Figure 1:
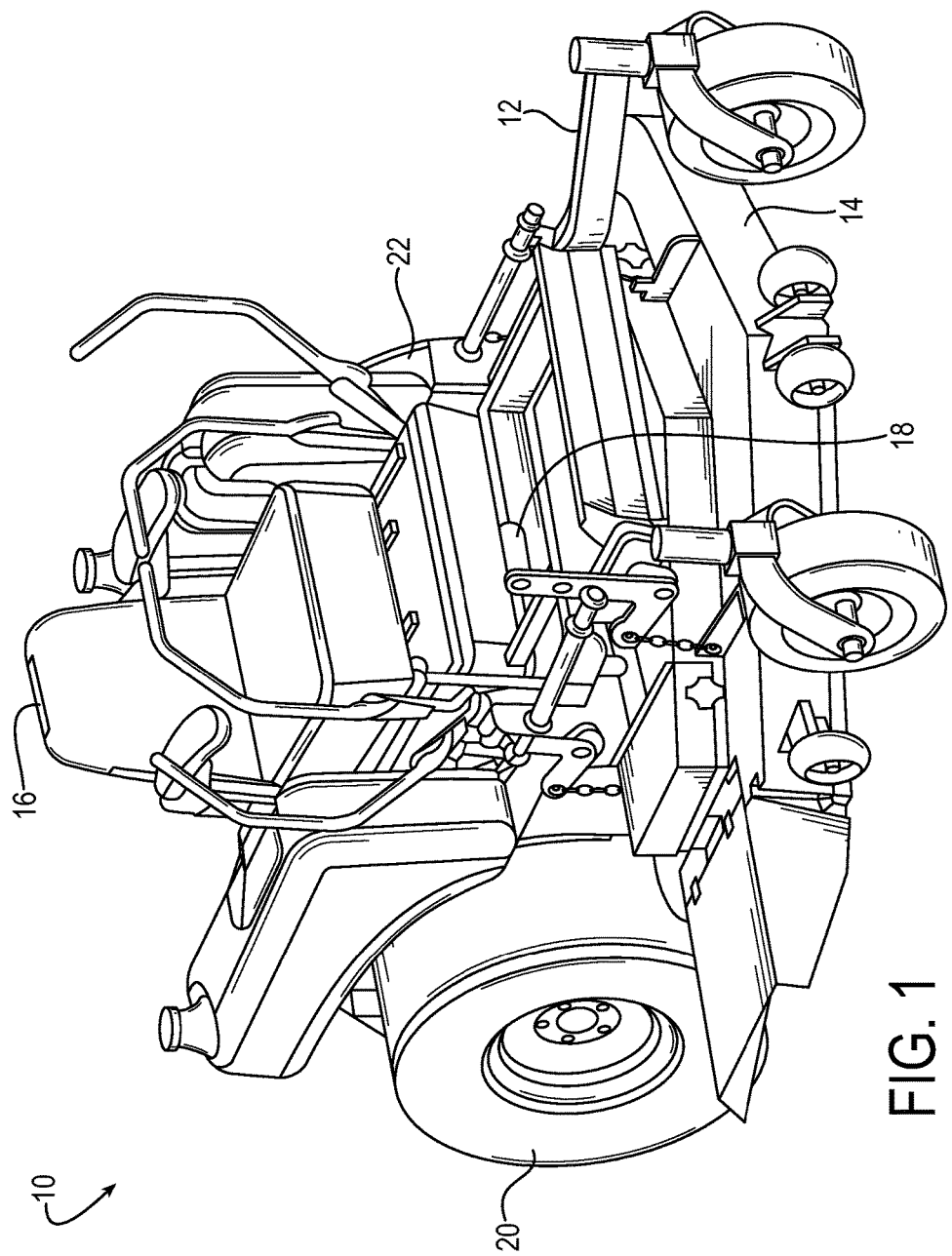
FIG. 1 is a perspective view of an exemplary zero-turn-radius mower.
Figure 2:
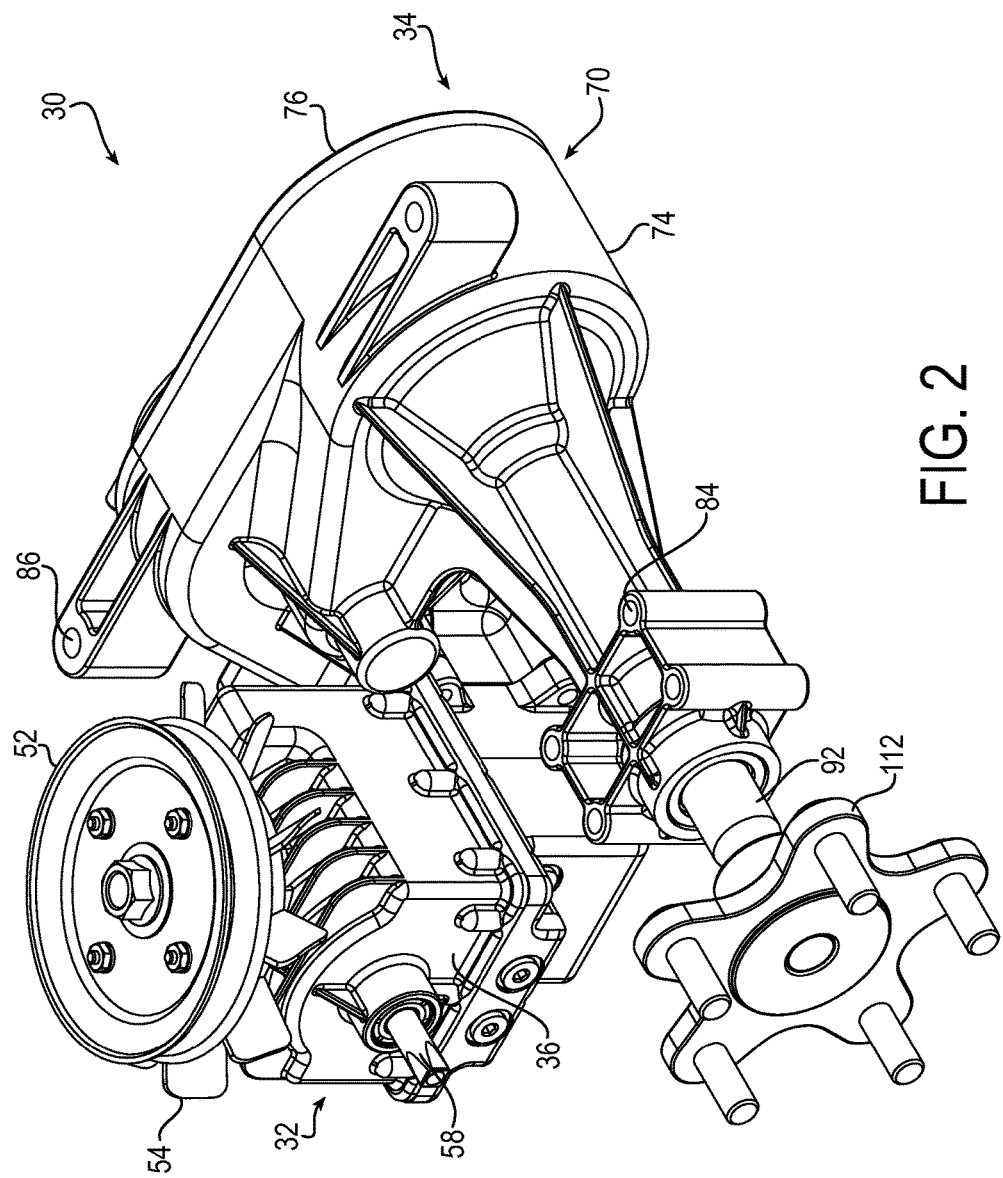
FIG. 2 is a perspective view of any exemplary hydrostatic transmission according to the invention.
Figure 3:
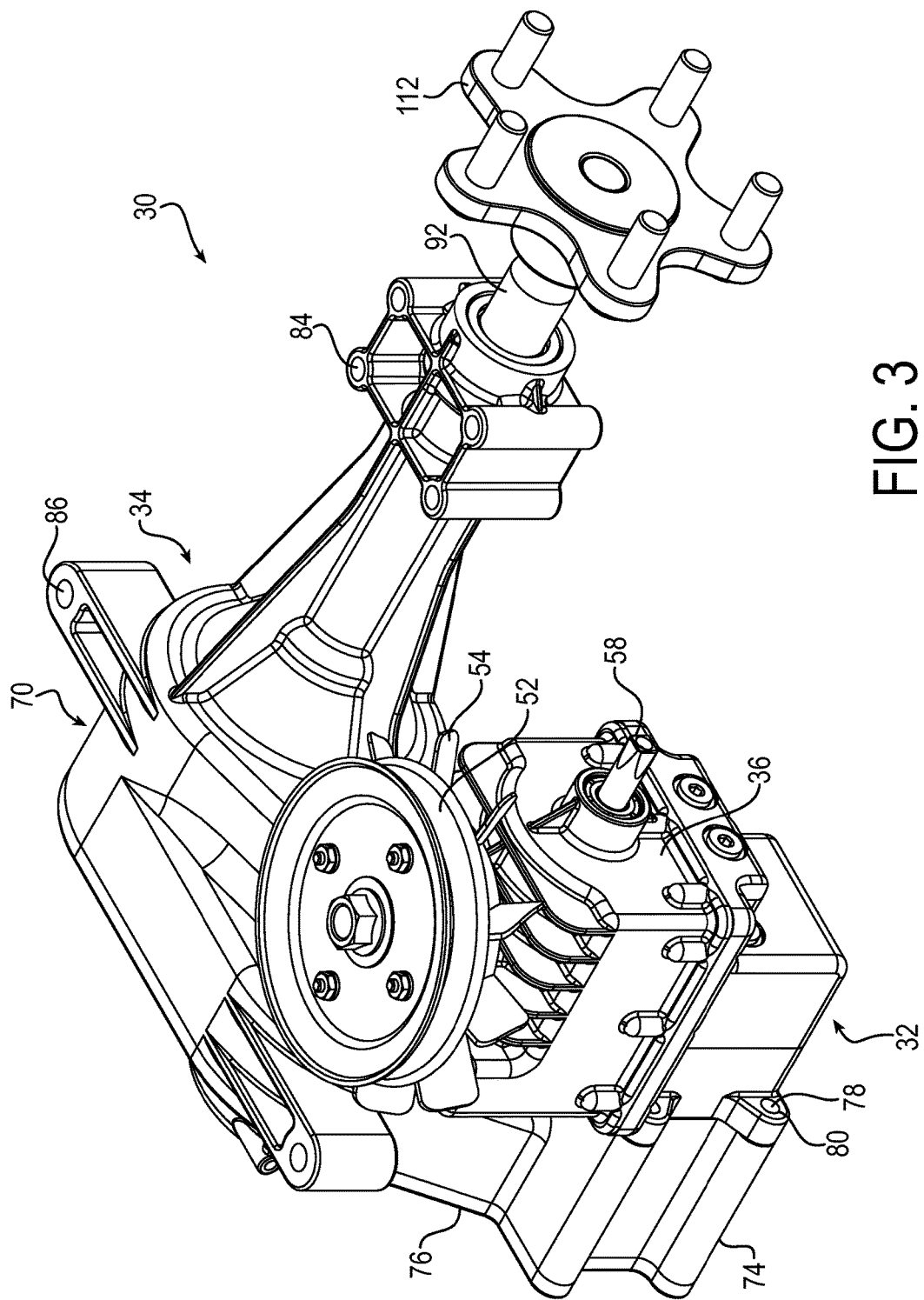
FIG. 3 is another perspective view of the hydrostatic transmission.
Figure 4:
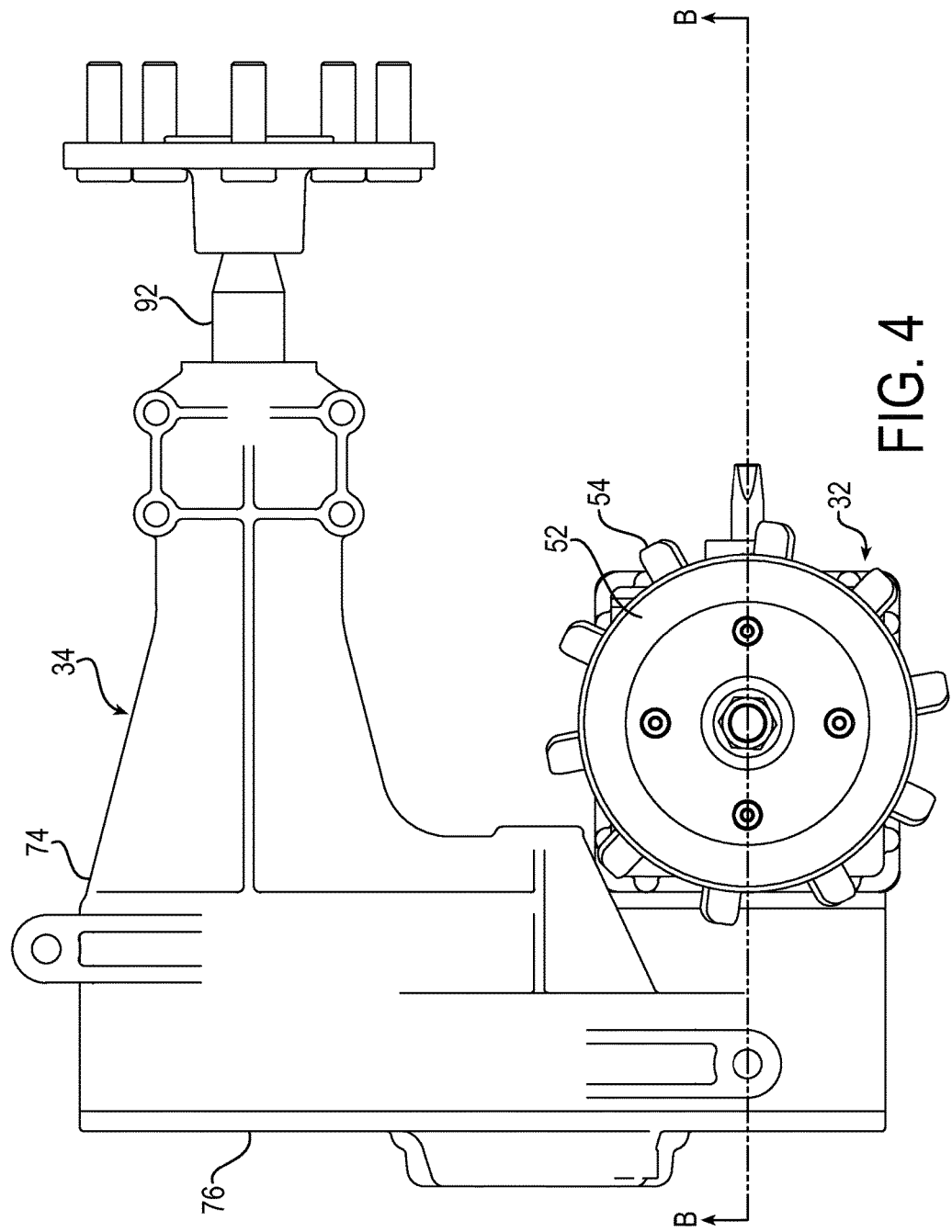
FIG. 4 is a top view of the hydrostatic transmission.
Figure 4A:
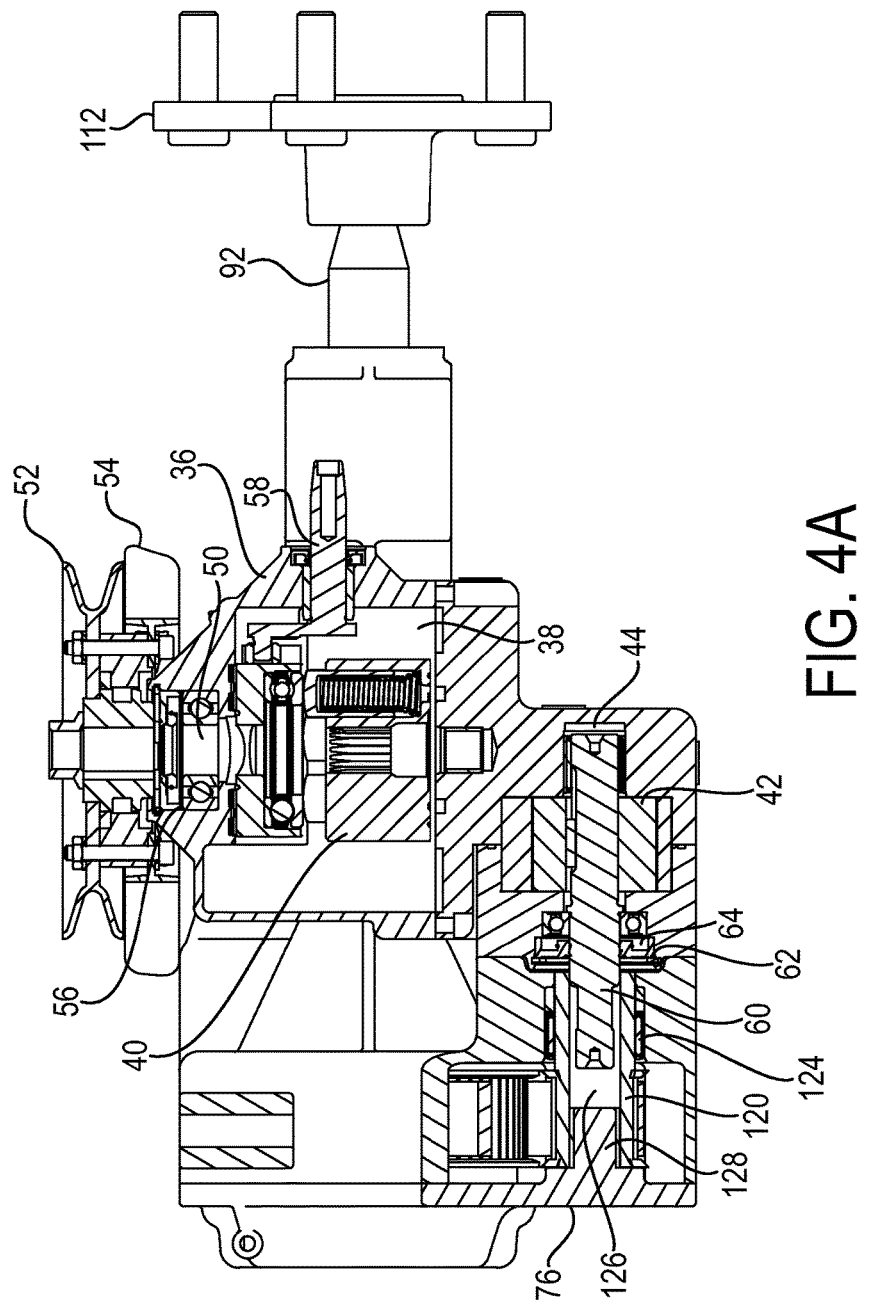
FIG. 4A is a cross-sectional view of the hydrostatic transmission taken about line B-B in FIG. 4.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 18 for operating the mower 10. A rear mounted engine (not shown) mounted to the frame 12 behind the seat 16 provides power to hydrostatic transmissions 30 (FIG. 2) mounted to the frame 12. The hydrostatic transmissions can be controlled by an operator to independently drive respective rear wheels 20 and 22 to propel the mower and provide zero-turn-radius functionality. The design of the illustrated mower 10 is merely exemplary in nature, and it will be appreciated that other mower designs and vehicle types can be used in accordance with the invention.

Turning now to FIGS. 2-4A, the hydrostatic transmission 30, which may be a high speed, low torque hydrostatic transmission, includes a pump/motor module 32 and a speed reduction module 34 coupled to the pump/motor module 32. The pump/motor module 32 and the speed reduction module 34 form a substantially u-shaped configuration when coupled together. The pump/motor module 32 includes a reservoir housing 36 forming interiorly thereof a reservoir chamber 38 for containing hydraulic fluid, a hydraulic pump 40 disposed in the reservoir housing 36, a hydraulic motor 42 disposed in the reservoir housing 36, and a center block 44 coupled to the hydraulic pump 40 and the hydraulic motor 42 to fluidly connect the hydraulic pump 40 and the hydraulic motor 42.

The hydraulic pump 40, which may be any suitable pump such as an axial piston pump, includes an input shaft 50 to which an input wheel 52 and a cooling fan 54 may be attached. The input shaft 50 projects from the reservoir housing 36 through an opening, such as opening 56 through a top of the reservoir housing 36. The input wheel 52, as shown, may be a pulley about which a drive belt can be trained as is customary for driving a pump off of an engine. Alternatively, other types of drive wheels may be employed, such as for example, a sprocket for use with a chain drive. The hydraulic pump 40 also includes a pump control shaft 58 that can be rotated to stroke a swashplate of the hydraulic pump 40 to control speed and direction of the pump.

The hydraulic motor 42, which may be any suitable motor such as a gerotor motor, piston motor, external gear motor, etc., includes an output shaft 60 projecting from the reservoir housing 36 through an opening, such as opening 62 through a side of the reservoir housing 36. The output shaft 60 is sealed to the reservoir housing 36 in any suitable manner, such as by shaft seal 64 that provides a seal between the output shaft 60 and the opening 62 to prevent hydraulic fluid from leaking out of the reservoir housing 36, and in particular from leaking into the speed reduction module 34.

Figure 5:
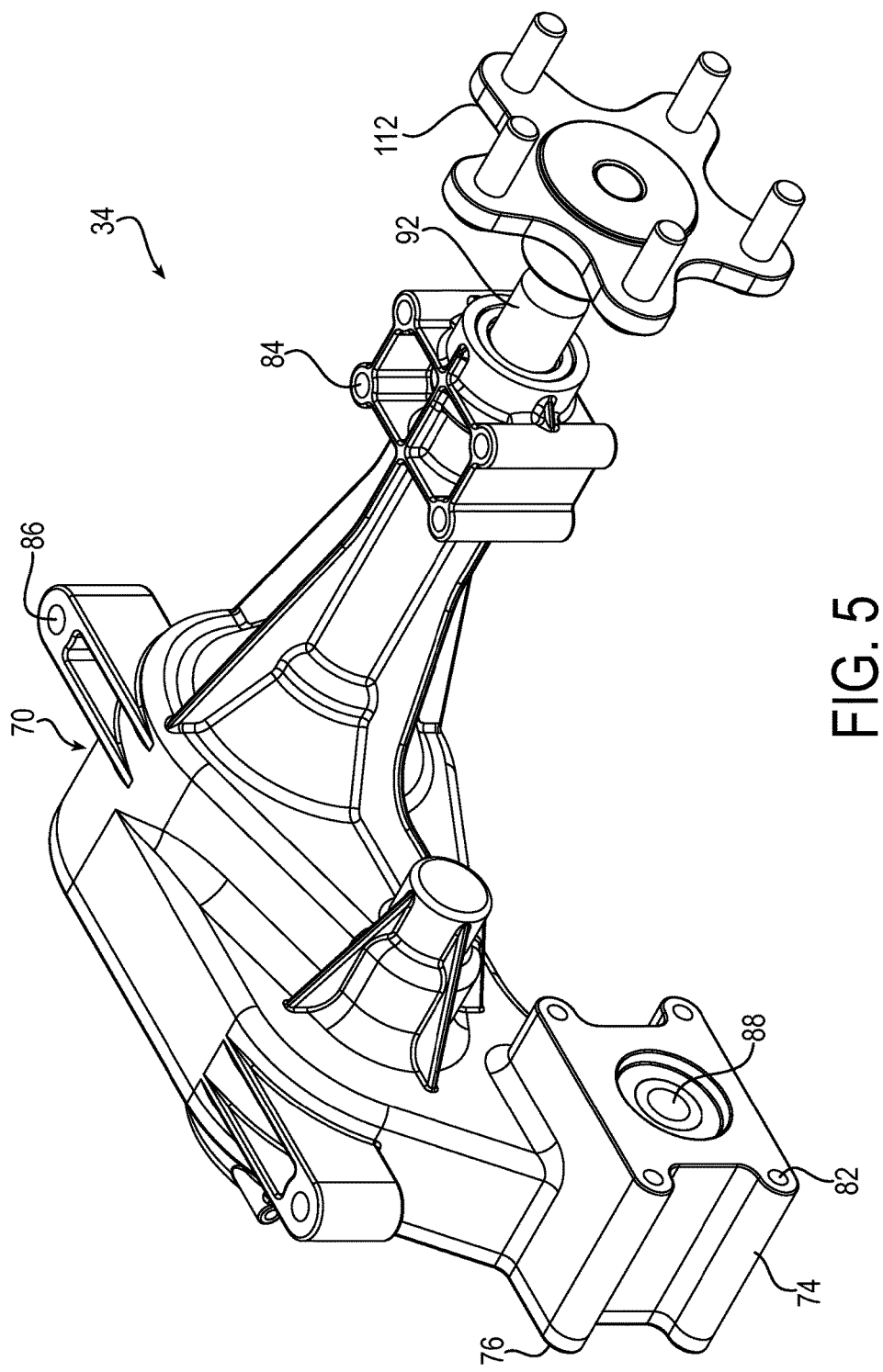
FIG. 5 is a perspective view of an exemplary speed reduction module of the hydrostatic transmission.
Figure 8:
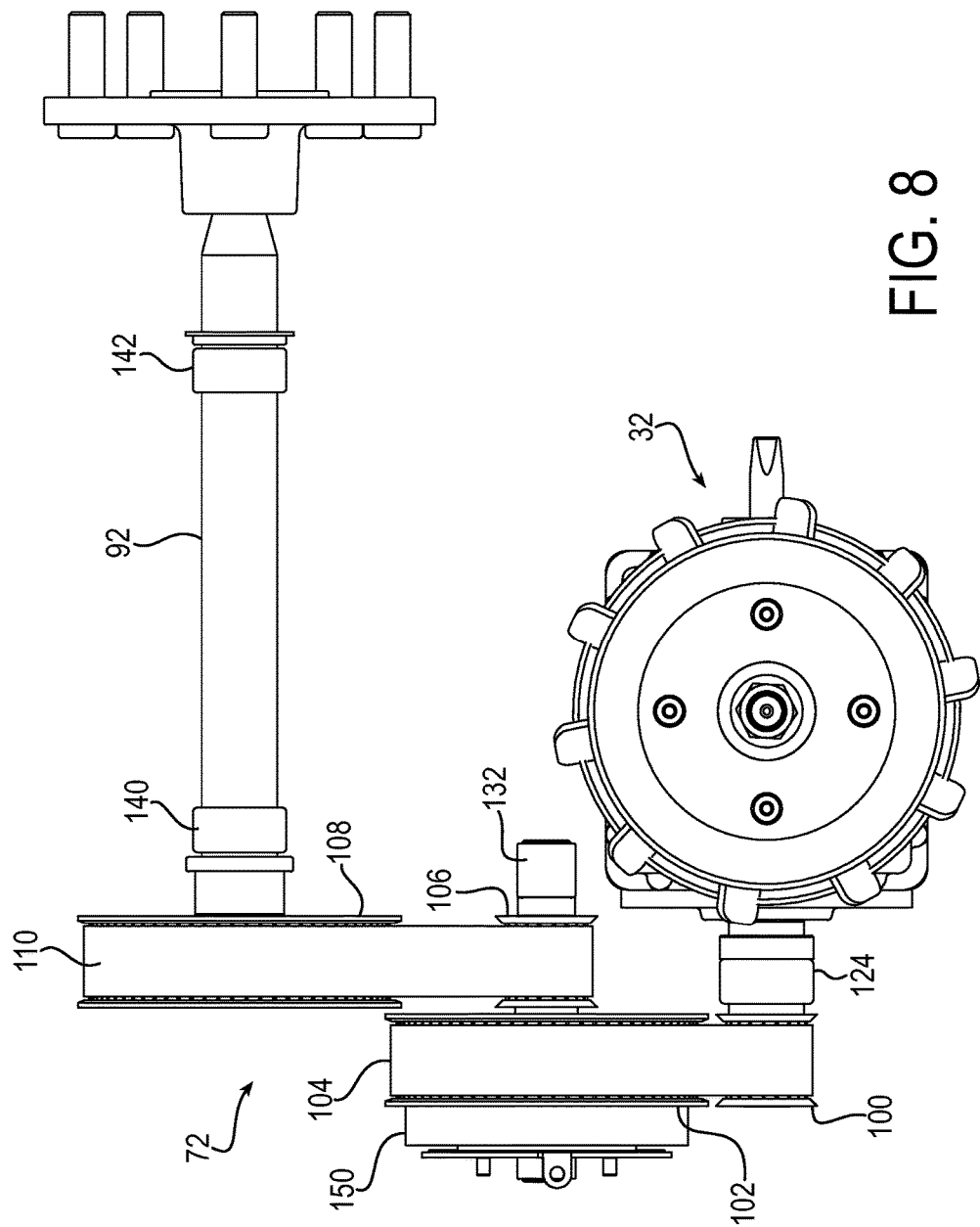
FIG. 8 is a top view of the pump/motor module and the speed reduction module with their respective housings removed.
Figure 9:
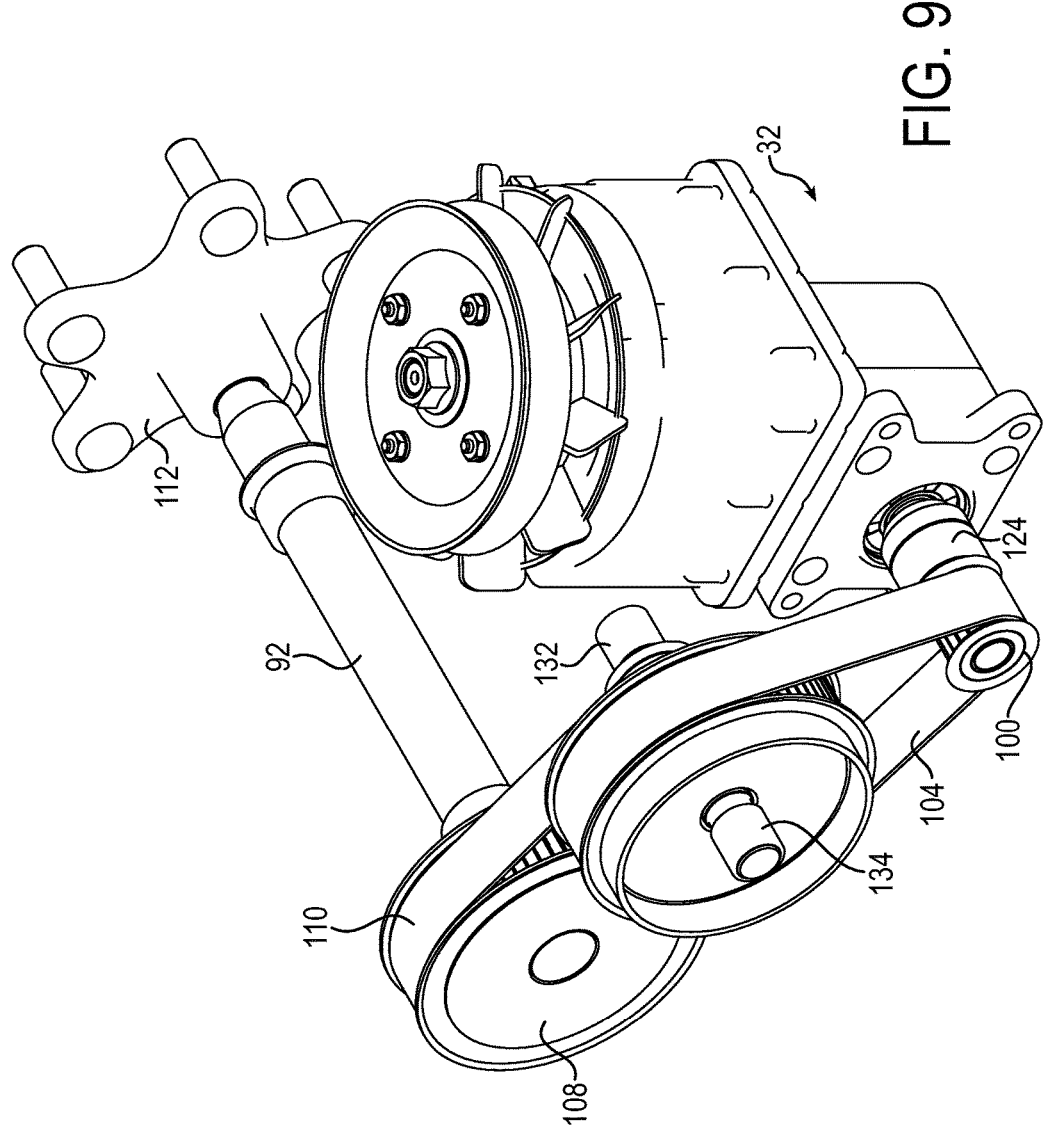
FIG. 9 is a rear perspective view of the pump/motor module and the speed reduction module with their respective housings removed.
Figure 10:
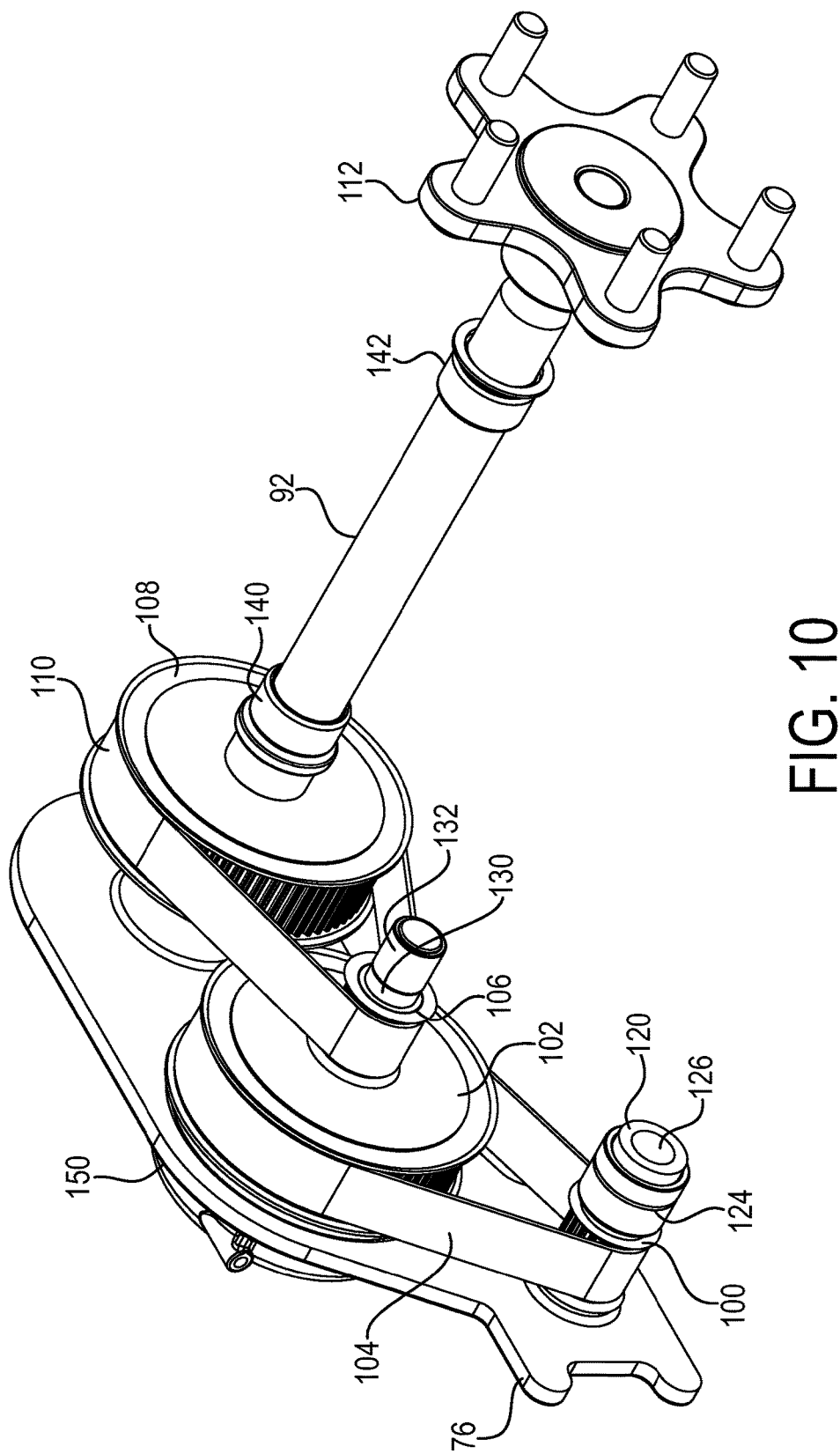
FIG. 10 is a perspective view of the speed reduction module with its housing removed.

Turning now to FIG. 5 in addition to FIGS. 2-4A, the speed reduction module 34 includes a speed reduction housing 70 and a speed reduction assembly 72 (FIG. 8) disposed in the speed reduction housing 70. The speed reduction housing 70 may include multiple portions, such as a casing 74, which may be die cast out of metal for example, and a cover plate 76 coupled to the casing 74 in any suitable manner to enclose the speed reduction assembly 72. The casing 72 and the cover plate 76 may be sealed to one another in any suitable manner, such as by a suitable dirt and water seal. Due to the speed reduction housing 70 being isolated from the hydraulic fluid in the reservoir housing 36 and the components in the speed reduction housing 70 not using hydraulic fluid, the speed reduction housing 70 does not include additional seals to prevent hydraulic fluid leakage.

The speed reduction housing 70 is configured to be coupled to the reservoir housing 36, for example by suitable fasteners, such as bolts 78 received in openings 80 in the casing 74 and openings 82 in the speed reduction housing 70. The casing 74 also includes one or more mounting points for mounting the speed reduction module 33, and thus the transmission 30 to the frame 12. For example, the casing 74 may include one or more openings 84 and one or more openings 86 that may receive suitable fasteners to mount the speed reduction module 34 to the frame 12. The casing 74 further includes an opening 88 through which the output shaft 60 of the hydraulic motor 42 extends and an opening 90 through which an axle shaft 92 of the speed reduction assembly 72 extends.

Turning now to FIGS. 6-10, the speed reduction assembly 72, which may be a two stage reduction assembly, includes an input member 100, a first intermediate member 102, a first belt/chain 104, a second intermediate member 106, an output member 108, a second belt/chain 110, and the axle shaft 92. The first and second belts/chains 104 and 110 may be any suitable belts or chains, such as synchronous positive engagement belts, zero-slip type belts or non-synchronous belts. As noted above, the components of the speed reduction assembly 72 are housed in the speed reduction housing 70. In an embodiment, the speed reduction housing 70 may be a substantially L-shaped housing as shown in FIG. 5. The L-shaped housing has one leg housing the input member 100, the first intermediate member 102, the first belt/chain 104, the second intermediate member 106, the output member 108, and the second belt/chain 110, and another leg housing the axle shaft 92.

The input member 100 is driven by the output shaft 60 of the hydraulic motor 42 and is rotationally connected to the first intermediate member 102, which is larger than the input member 100, by the first belt/chain 104. The second intermediate member 106, which is smaller than the first intermediate member 102, is connected to the first intermediate member 102 for rotation therewith. The second intermediate member 106 is rotationally connected to the output member 108, which is larger than the second intermediate member 106, by the second belt/chain 110. The axle shaft 92 is driven by rotation of the output member 108 to rotate a wheel hub 112 connected to the axle shaft 92 for driving the vehicle. As shown, the output member 108 is connected to the axle shaft 92 such that rotation of the output member 108 effects rotation of the axle shaft 92, and a rotational axis of the axle shaft 92 is parallel to a rotational axis of the output shaft 60.

The input member 100, which may be a sprocket or pulley, for example, surrounds an input shaft 120 of the speed reduction assembly 72 and is connected to the input shaft 120 for rotation therewith, for example by a keyed or splined connection. The input shaft 120 includes a passage 126 that receives the output shaft 60 of the hydraulic motor 42 and is connected thereto, for example by a keyed or splined connection, such that rotation of the output shaft 60 effects rotation of the input shaft 120, thereby effecting rotation of the input member 100. The passage 126 may also receive a projection 128 of the cover plate 76 at an end opposite the end that receives the output shaft 60 that allows the input shaft 120 to rotate. The projection 128 may be replaced by or provided in addition to a suitable bearing coupled to the cover plate 76 to allow the input shaft 120 to rotate. The input shaft 120 may also be surrounded by one or more bearings 124 that are supported in the speed reduction housing 70 and/or the reservoir housing 36 to allow the input shaft 120 to rotate.

Figure 11:
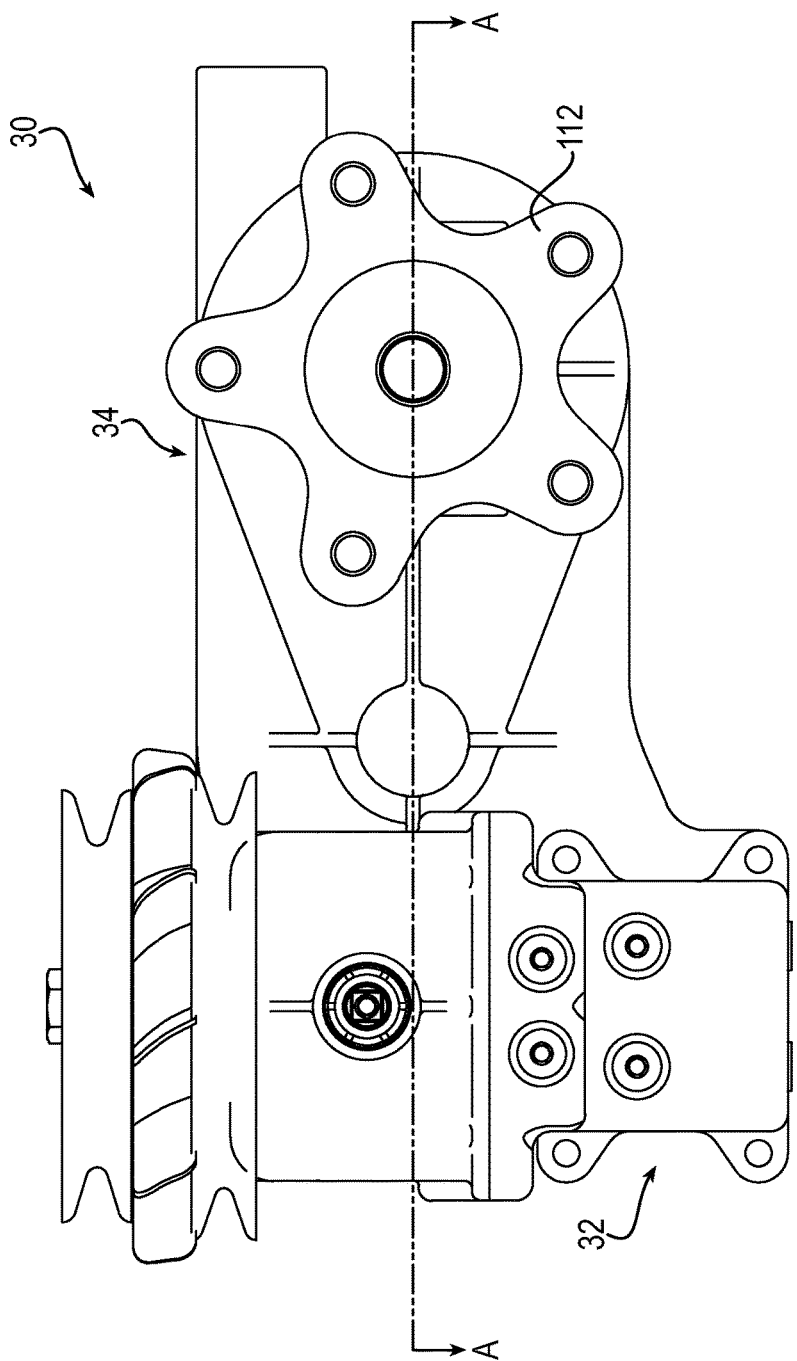
FIG. 11 is a front view of the hydrostatic transmission.
Figure 11A:
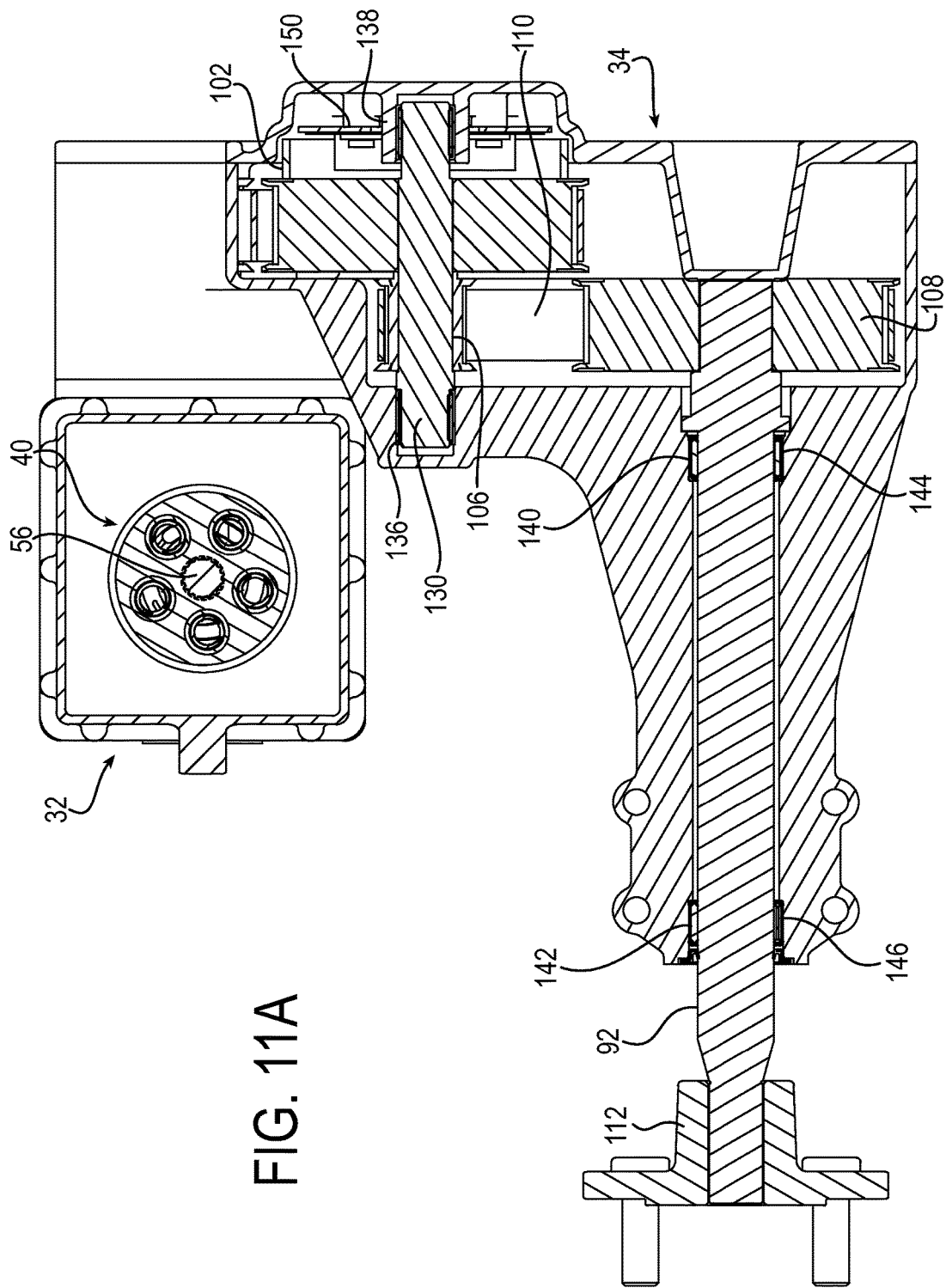
FIG. 11A is a cross-sectional view of the hydrostatic transmission taken about line A-A in FIG. 11.

The first and second intermediate members 102 and 106, which may be sprockets or pulleys, for example, may be coaxial and surround an intermediate shaft 130. The first and second intermediate members 102 and 106 may be coupled to the intermediate shaft 130 for rotation therewith, for example by a keyed or splined connection, or the intermediate shaft 130 may be fixed to the casing 74 and cover plate 76 and the second intermediate member 106 coupled to the first intermediate member 102 for rotation therewith. In an embodiment where the first and second intermediate members 102 and 106 are coupled to the intermediate shaft 130 for rotation therewith, the intermediate shaft 130 is supported in the speed reduction housing 70 as shown in FIG. 11A and surrounded by bearings 132 and 134 to allow the intermediate shaft 130 to rotate. The bearings 132 and 134 may be supported by respective supports 136 and 138 in the housing 70. Rotation of the input member 100 rotates the belt/chain 104, thereby rotating the first intermediate member 102, the intermediate shaft 130 and the second intermediate member 106.

The output member 108, which may be a sprocket or pulley for example, surrounds the axle shaft 92 and is connected to the axle shaft 92 for rotation therewith, for example by a keyed or splined connection. The axle shaft 92 may be surrounded by one or more bearings, such as bearings 140 and 142, which may be supported in the speed reduction housing 70 as shown in FIG. 11A to allow the axle shaft 92 to rotate. The bearings 140 and 142 may be supported by respective supports 144 and 146 in the housing 70. An additional bearing (not shown) may be provided between the cover plate 76 and the output member 108 and coupled to the axle shaft 92 and/or the output member 108 to allow the output member 108 and axle shaft 92 to rotate. Rotation of the second intermediate member 106 rotates the belt/chain 110, thereby rotating the output member 108 and the axle shaft 92 to rotate the wheel hub 112.

Figure 6:
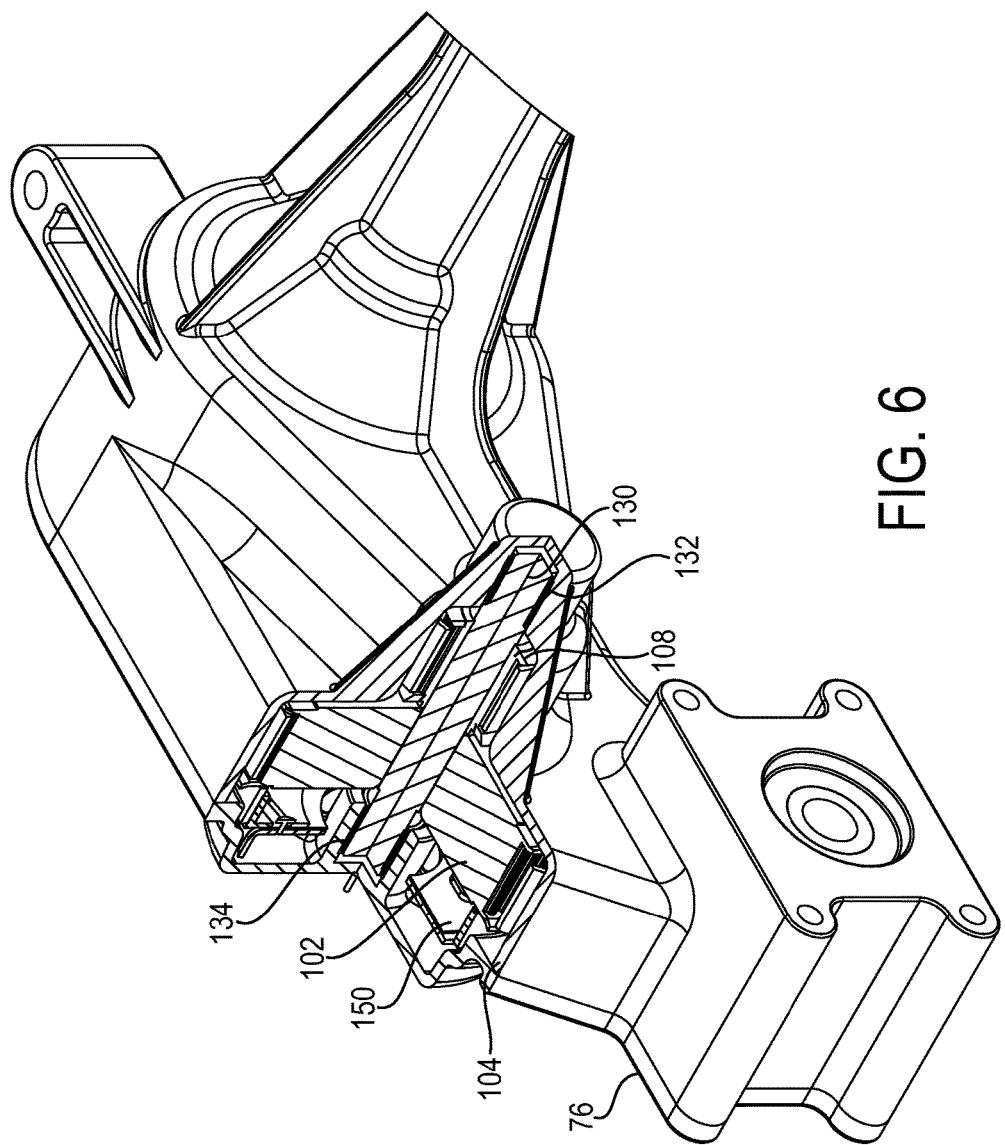
FIG. 6 is a partial perspective view of the speed reduction module with a portion of the assembly shown in cross-section.
Figure 7:
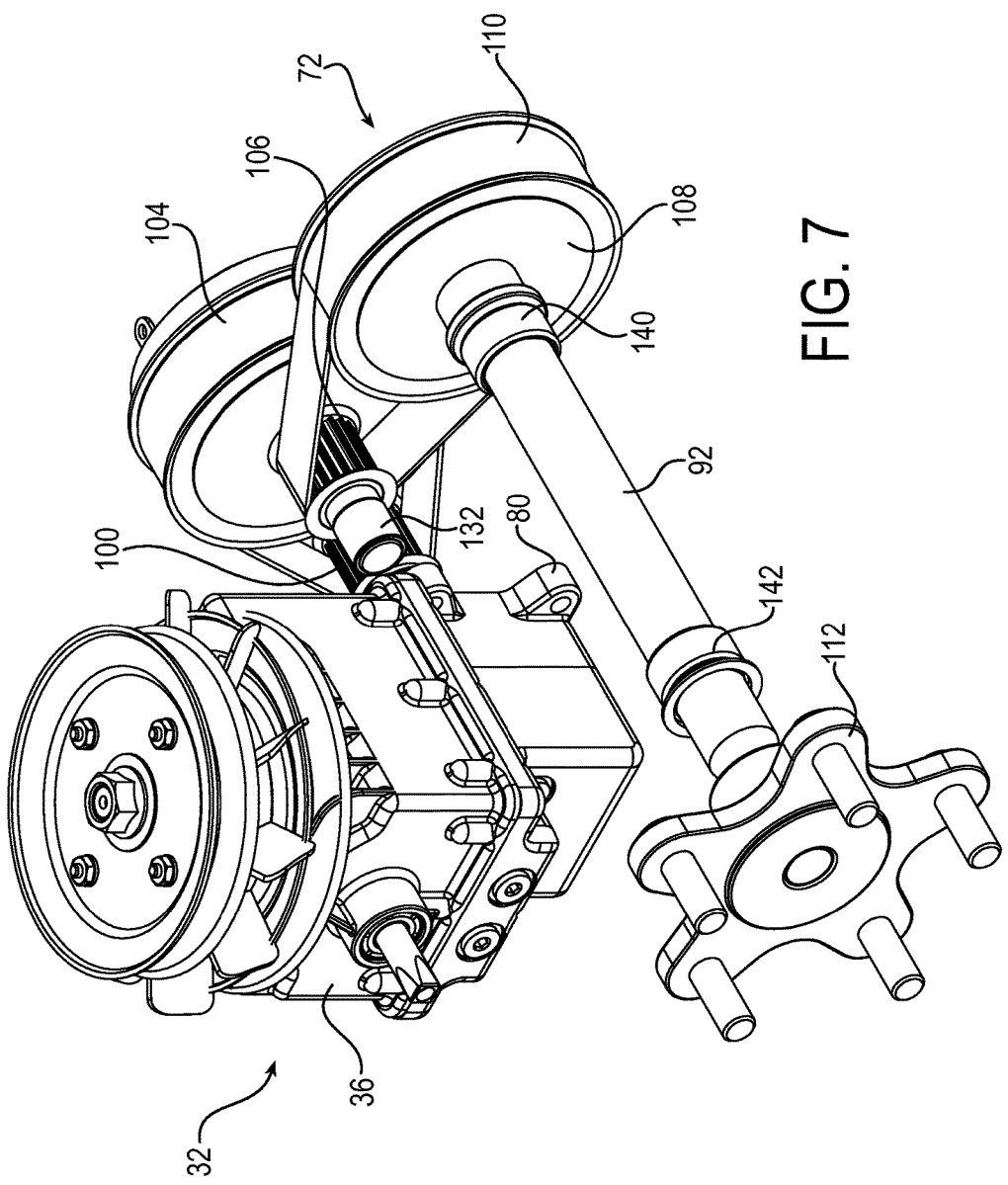
FIG. 7 is a perspective view of an exemplary pump/motor module and the speed reduction module with their respective housings removed.

The speed reduction module 34 additionally includes a brake assembly 150, which may be any suitable brake assembly such as a shoe-type friction brake connected to an operator control for braking the axle shaft 92. The brake assembly 150 may be provided in the speed reduction housing 70 surrounding the intermediate shaft 130 between the cover plate 76 and the first intermediate member 102 to act on the first intermediate member 102 as best shown in FIG. 6. By providing the brake assembly 150 to act on the first intermediate member 102, i.e. in a location in the speed reduction assembly 72 where a speed reduction exists, a mechanical advantage is provided such that braking capacity is reduced, for example a braking capacity reduction of between fifty percent to eighty percent over a brake assembly not acting where a speed reduction occurs.

During operation of the hydrostatic transmission 30, rotation of the hydraulic pump 40 against a moveable swash plate creates an axial motion of the pump pistons that forces hydraulic fluid through the hydraulic porting, such as the center block 44, to the hydraulic motor 42 to cause the output shaft 60 to rotate. The output shaft 60 rotates the input shaft 120 to rotate the input member 100. Rotation of the input member 100 rotates the first belt/chain 104, which rotates the first intermediate member 102 and the second intermediate member 106. Rotation of the second intermediate member 106 rotates the second belt/chain 110, which rotates the output member 108 and the axle shaft 92, thereby rotating the hub 112 and wheel of the vehicle 10.

In hydrostatic transmissions using an integral housing that serves as a hydraulic reservoir and that houses a hydraulic pump, hydraulic motor, and gears, particulates from the gears may collect in the hydraulic fluid in the hydraulic reservoir and cause damage to the hydraulic pump and hydraulic motor using the hydraulic fluid. The hydrostatic transmission 30 eliminates gears and instead uses the pulleys/sprockets 100, 102, 106 and 108 and the belts/chains 104 and 110 in the speed reduction housing 70 that is separate from the reservoir housing 36. By providing the speed reduction assembly 72 in the speed reduction housing 70 separate from the reservoir housing 36, the speed reduction assembly 72 is isolated from the hydraulic fluid in the reservoir chamber 38. In this way, particulates from the speed reduction assembly 72 are prevented from entering the hydraulic fluid in the reservoir housing 36. By preventing particulates from the speed reduction assembly 72 entering the hydraulic fluid in the reservoir housing 36, a screen or magnet may be used for filtration rather than a filtration system. In addition, by utilizing the pulleys/sprockets 100, 102, 106 and 108 and the belts/chains 104 and 110, the hydrostatic transmission 30 has better sound quality and the speed reduction assembly 72 provides for easier service and/or replacement than a gear driven assembly.

The transmission 30 may be a high speed, low torque hydrostatic transmission that includes an axial piston pump, a gerotor motor, check valves with integral bypass, which seal when pressurized to allow oil to be pulled from the reservoir at low pressure, an integral reservoir, a strainer/filter, an input belt sheave, which may be offset to reduce height, a cooling fan and a charge pump. Varying ratios of motor displacement to pump displacement may be used to optimize the speed reduction assembly.

In an embodiment of the speed reduction assembly, a dual stage gear drive may be provided similar to the above described speed reduction assembly 72 but the pulleys/sprockets and belts/chains may be replaced by gears. In still another embodiment, a single stage drive may be provided where a selection of a larger displacement motor in a high speed low torque hydrostatic transmission reduces the reduction ratio required in the mechanical speed reduction. The single stage may be belt/chain driven as discussed above, gear driven, such as by spur pinion and gear, helical pinion and gear, straight or helical gear and pinion, hypoid gear set, planetary gear train, etc.

The above described elements may be assembled into a transmission for a relatively light duty vehicle, such as a residential mowing machine.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission including:
    a pump/motor module including:
        a reservoir housing forming interiorly thereof a reservoir chamber for containing hydraulic fluid;
        a hydraulic pump disposed in the reservoir housing, the hydraulic pump including an input shaft projecting from the reservoir housing through an input shaft opening in the reservoir housing and having an input wheel attached to the input shaft; and
        a hydraulic motor disposed in the reservoir housing and fluidly coupled to the hydraulic pump, the hydraulic motor including an output shaft extending through an output shaft opening in the reservoir housing, the output shaft having a rotational axis perpendicular to a rotational axis of the input shaft of the hydraulic pump; and
    a speed reduction module including:
        a speed reduction housing configured to be coupled to the reservoir housing; and
        a speed reduction assembly disposed in the speed reduction housing, the speed reduction assembly including an input member driven by the output shaft of the hydraulic motor, an output member rotationally connected to the input member by one or more belts/chains, and only a single axle shaft extending through an axle shaft opening in the speed reduction housing and being driven by rotation of the output member, the single axle shaft having thereon a single wheel hub to which a wheel of a vehicle can be mounted, whereby there is just one pump/motor module and one speed reduction module for driving a respective wheel of the vehicle; and
    wherein the output shaft opening in the reservoir housing through which the output shaft passes is sealed to prevent hydraulic fluid in the reservoir housing from flowing out of the reservoir housing and into the speed reduction housing; and
    wherein the speed reduction housing includes a casing and a cover for closing an opening in the casing through which access can be had to the one or more belts/chains, and the cover is removable from the casing without having to remove the speed reduction housing of the speed reduction module from the reservoir housing of the pump/motor module.

2. The hydrostatic transmission according to claim 1, wherein a rotational axis of the output shaft of the hydraulic motor is parallel to a rotational axis of the axle shaft.

3. The hydrostatic transmission according to claim 1, wherein the pump/motor module includes a shaft seal surrounding the output shaft of the hydraulic motor for preventing fluid in the reservoir chamber from flowing into the speed reduction housing.

4. The hydrostatic transmission according to claim 1, wherein the pump/motor module and the speed reduction module form a u-shaped configuration when coupled together.

5. The hydrostatic transmission according to claim 1, wherein the input member surrounds the output shaft of the motor, and wherein rotation of the output shaft effects rotation of the input member.

6. The hydrostatic transmission according to claim 1, wherein the output member surrounds the axle shaft, and wherein rotation of the output member effects rotation of the axle shaft.

7. The hydrostatic transmission according to claim 1, wherein the input member includes a first pulley/sprocket and the output member includes a second pulley/sprocket.

8. The hydrostatic transmission according to claim 7, wherein the speed reduction assembly further includes an intermediate shaft and third and fourth pulley/sprockets surrounding the intermediate shaft.

9. The hydrostatic transmission according to claim 8, wherein the speed reduction assembly includes a first belt/chain connecting the first pulley/sprocket and the third pulley/sprocket, and a second belt/chain connecting the fourth pulley/sprocket and the second pulley/sprocket, thereby providing a two stage reduction assembly.

10. The hydrostatic transmission according to claim 9, wherein the speed reduction assembly further includes a brake assembly connected to the third and fourth pulley/sprockets for braking the axle shaft.

11. The hydrostatic transmission according to claim 9, wherein the fourth pulley/sprocket is coupled to the third pulley/sprocket for rotation therewith.

12. The hydrostatic transmission according to claim 1, wherein the speed reduction housing is an L-shaped housing having one leg housing the input and output members and the one or more belts/chains, and another leg housing the axle shaft.

13. A mower including:
a frame;
a mower deck supported by the frame; and
a pair of hydrostatic transmissions according to claim 1 mounted to the frame and to which respective wheels of the mower are individually mounted.

14. The hydrostatic transmission according to claim 1, wherein the speed reduction module further includes a brake acting on the first intermediate member for braking the axle shaft, and the brake is located between the cover and the first intermediate member.

15. The hydrostatic transmission according to claim 1, wherein the speed reduction housing is coupled to the reservoir housing at a first side of the reservoir housing, and the hydraulic pump has a pump control shaft that extends through a pump control shaft opening in the reservoir housing at a side of the reservoir housing opposite the first side of the reservoir housing.

16. A hydrostatic transmission including:
a pump/motor module including:
   a reservoir housing forming interiorly thereof a reservoir chamber for containing hydraulic fluid;
   a hydraulic pump disposed in the reservoir housing, the hydraulic pump including an input shaft projecting from the reservoir housing through an input shaft opening in the reservoir housing and having an input wheel attached to the input shaft; and
   a hydraulic motor disposed in the reservoir housing and fluidly coupled to the hydraulic pump, the hydraulic motor including an output shaft extending through an output shaft opening in the reservoir housing, the output shaft having a rotational axis perpendicular to a rotational axis of the input shaft of the hydraulic pump; and
a speed reduction module including:
   a speed reduction housing configured to be coupled to the reservoir housing; and
   a speed reduction assembly disposed in the housing, the speed reduction assembly including an input member driven by the output shaft of the hydraulic motor, a first intermediate member rotationally connected to the input member by a first belt/chain, a second intermediate member connected to the first intermediate member for rotation therewith, an output member rotationally connected to the second intermediate member by a second belt/chain, and only a single axle shaft extending through an axle shaft opening in the speed reduction housing and being driven by rotation of the output member, the single axle shaft having thereon a single wheel hub to which a wheel of a vehicle can be mounted, whereby there is just one pump/motor module and one speed reduction module for driving a respective wheel of the vehicle; and
wherein the output shaft opening in the reservoir housing through which the output shaft passes is sealed to prevent hydraulic fluid in the reservoir housing from flowing out of the reservoir housing and into the speed reduction housing; and
wherein the speed reduction housing includes a casing and a cover for closing an opening in the casing through which access can be had to the first belt/chain and second belt/chain, and the cover is removable from the casing without having to remove the speed reduction housing of the speed reduction module from the reservoir housing of the pump/motor module.

17. The hydrostatic transmission according to claim 16, wherein the speed reduction module further includes a brake module acting on the first and second intermediate members for braking the axle shaft.

18. The hydrostatic transmission according to claim 16, wherein the speed reduction module further includes a brake acting on the first intermediate member for braking the axle shaft, and the brake is located between the cover and the first intermediate member.

\* \* \* \* \*